Oct. 24, 1950     J. D. GADDIE     2,527,303
APPARATUS FOR STEMMING FRUITS AND BERRIES
Filed Nov. 6, 1946     3 Sheets-Sheet 1
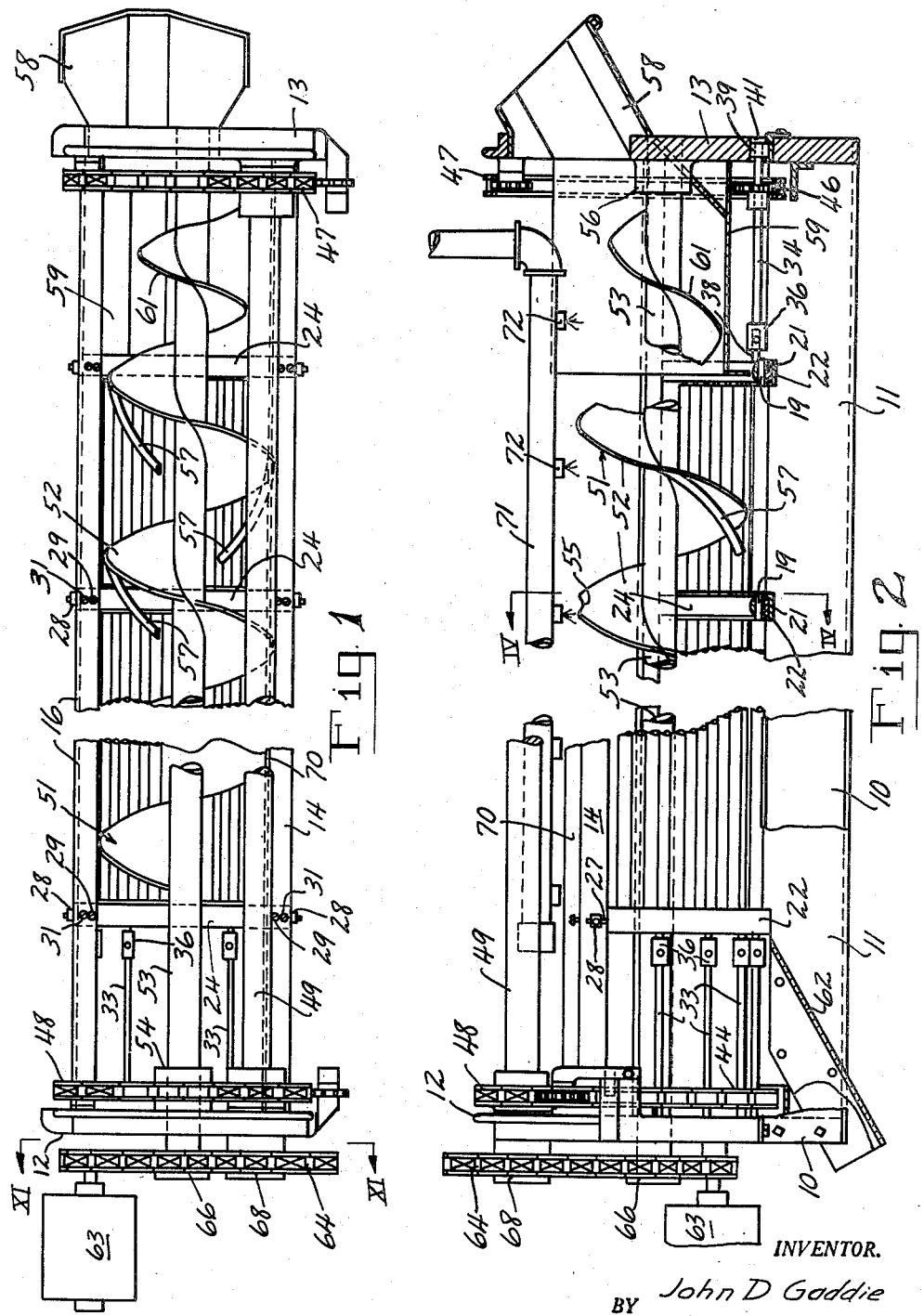
INVENTOR.
BY John D Gaddie
Henry L Jennings
Attorney Oct. 24, 1950 J. D. GADDIE 2,527,303
APPARATUS FOR STEMMING FRUITS AND BERRIES
Filed Nov. 6, 1946 3 Sheets-Sheet 2
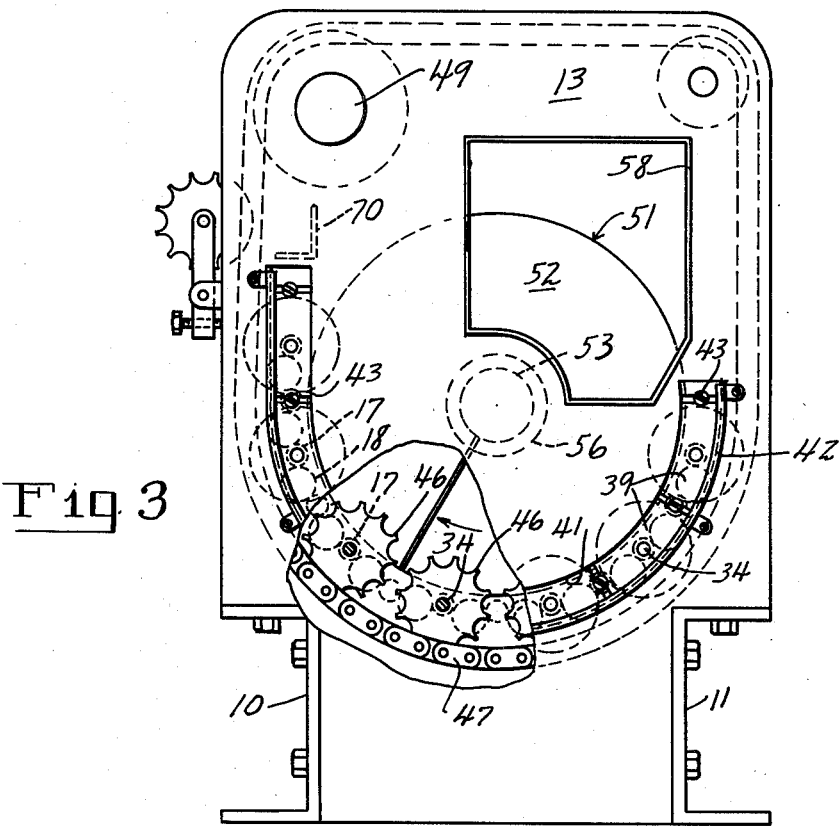
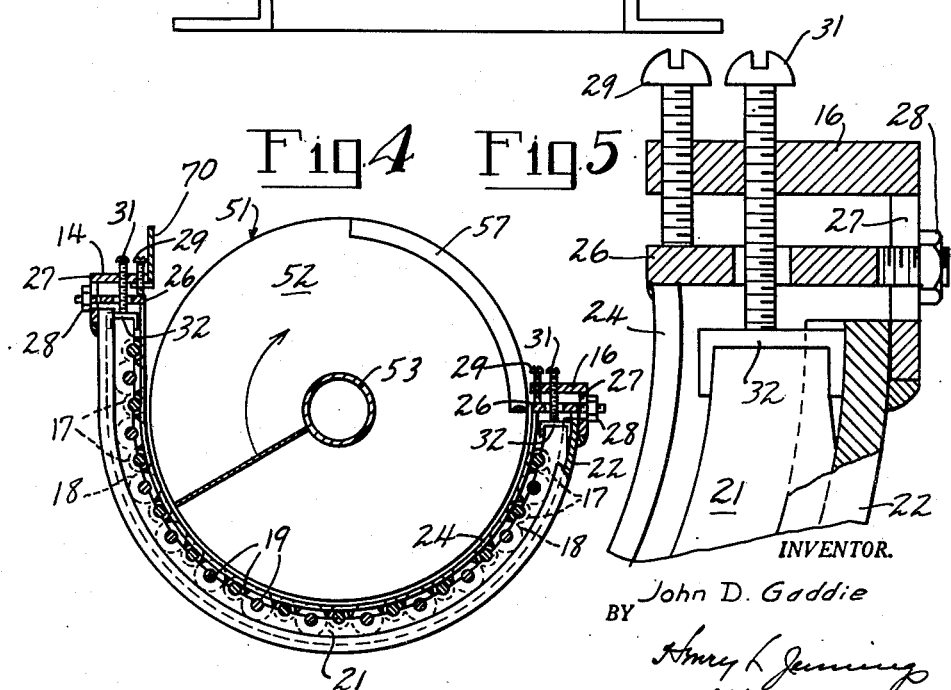
INVENTOR.
John D. Gaddie
BY
Henry L. Jennings
Attorney

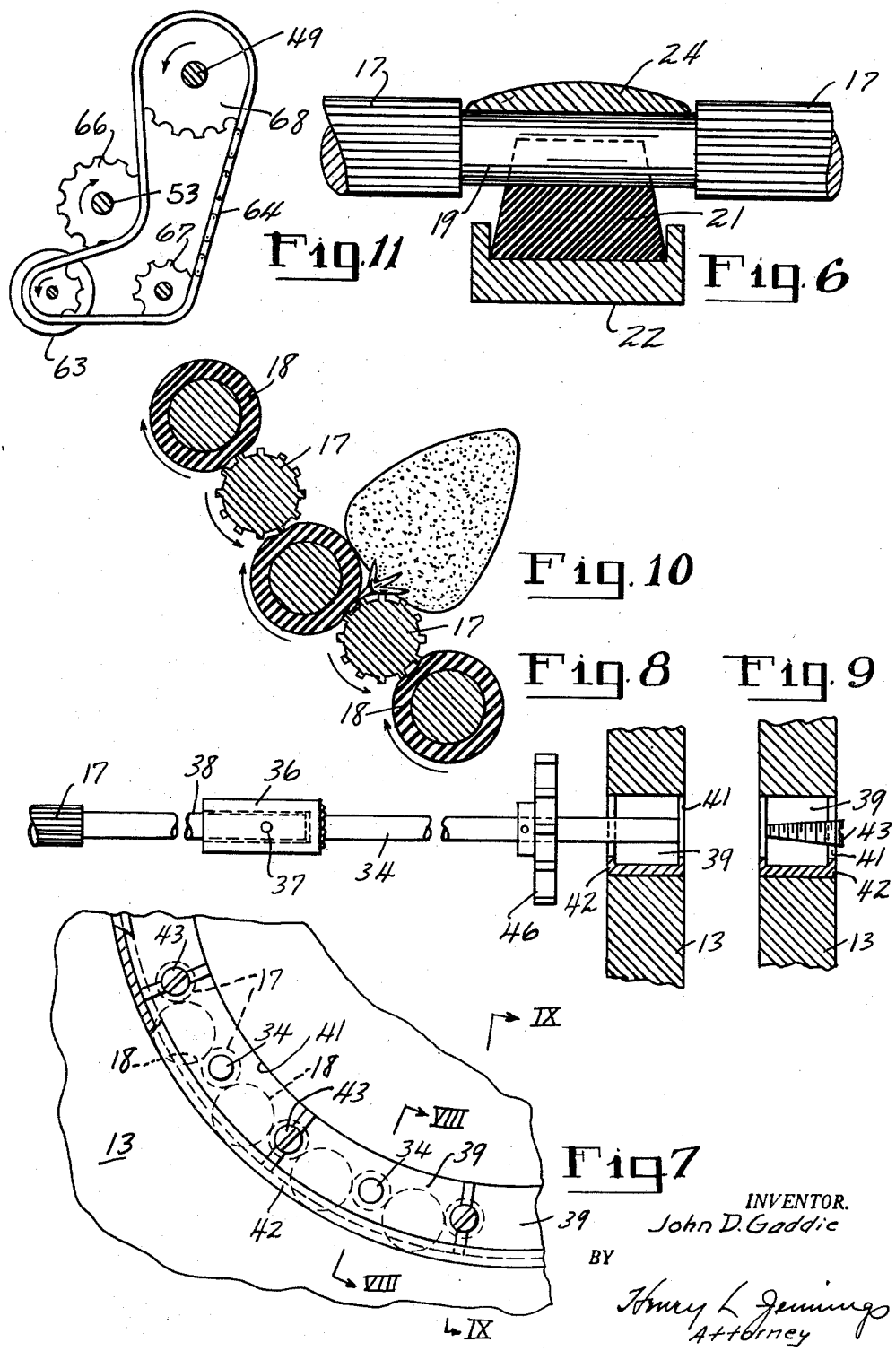

Patented Oct. 24, 1950

2,527,303

UNITED STATES PATENT OFFICE 2,527,303

APPARATUS FOR STEMMING FRUITS AND BERRIES

John D. Gaddie, Weslaco, Tex.

Application November 6, 1946, Serial No. 708,051

6 Claims. (Cl. 146—55)

This invention relates to apparatus for removing stems from fruits and berries and has for its object the provision of apparatus of the character designated which shall be simple of design and construction, have a relatively large capacity and which shall be capable of stripping stems and caps from fruits and berries without injury thereto.

A further object of my invention is to provide a stem removing machine in which fruits and berries may be subjected to the action of corrugated metal and soft rubber rolls and in which means are provided to subject the fruits or berries being stemmed to repeated action of the rolls.

A more specific object of my invention is to provide stemming apparatus which shall include a roll bed, arcuate in cross section, and comprised of alternating corrugated metal and soft rubber surfaced rolls, together with a helical screw conveyer for passing the fruits or berries from one end to the other of the bed.

Briefly, my invention comprises a trough like roll bed made up of alternating corrugated metal and soft rolls between which the stems of the fruits are pinched and removed. The bed is arcuate in cross section, and has mounted therein, concentric therewith, a helical screw conveyer. The fruits or berries are fed into one end of the trough-like bed and are conveyed to the opposite end thereof, being exposed at all times to the rotating rolls, whereby, by the time they arrive at the opposite end of the bed all stems and caps are removed therefrom. A series of water sprays are directed downwardly into the trough, and aid in keeping the rolls clean and in removing stems and caps therefrom. The rolls are mounted in yieldable bearings whereby the pinching effect on the stems and caps may be adjusted to that required to remove them.

Apparatus embodying features of my invention is illustrated in the accompanying drawings, forming a part of this application, in which Fig. 1 is a plan view thereof;

Fig. 2 is a longitudinal sectional elevation;

Fig. 3 is an end view, partly broken away and in sections;

Fig. 4 is a sectional view taken along the line IV—IV of Fig. 2;

Fig. 5 is a detail sectional view showing the means for adjusting the bearings for the rolls;

Fig. 6 is a detail sectional view drawn to an enlarged scale of one of the roll bearings;

Fig. 7 is a detail view of a portion of one end of the machine and illustrating the adjustment for the drive spindle bearings;

Fig. 8 is a detail sectional view taken along the line VIII—VIII of Fig. 7;

Fig. 9 is a detail sectional view taken along the line IX—IX of Fig. 7;

Fig. 10 is a detail sectional view drawn to an enlarged scale illustrating the action of the rolls in stemming strawberries; and Fig. 11 is a diagrammatic view showing the driving mechanism as viewed along line XI—XI of Fig. 1.

Referring now to the drawings for a better understanding of my invention, my improved apparatus embodies longitudinal frame members 10 and 11, preferably in the form of structural channels, which are joined to end frame members 12 and 13. Also extending longitudinally of the apparatus and joined to the end frame members are side frame angle members 14 and 16, from which the roller bed is supported.

The roller bed as indicated in Figs. 3, 4, and 10, is arcuate in cross section, and comprises alternating fluted metal rolls 17 and soft rubber surfaced rolls 18. The fluted metal rolls 17 are all driven in the direction shown by the arrows in Fig. 10, in a manner to be described later, and the soft rubber surfaced rolls 18 are driven by frictional engagement with the fluted rolls. As will also be seen more clearly in Figs. 4 and 10 of the drawings, the rotational axes of the fluted rolls 17 are disposed inwardly of the roll bed in relation to the rotational axes of the soft rubber surfaced rolls 18.

All of the rolls are provided with spaced bearing necks 19 which rest in bearings 21 which, in turn, are seated in bearing supporting channels 22 having their ends secured to the side frame members 14 and 16. The bearings 21 are formed in a unitary strip of resilient material, preferably a rubber and fabric composition similar to that employed in the manufacture of V belts. The bearings are notched out in this strip as shown in Fig. 4 of the drawing. On the inside of the trough, opposite each of the bearing supporting channels 22, I provide a bearing retainer 24 which is semi-oval in cross section as seen in Fig. 6 of the drawing to protrude as little as possible into the trough and which bears against the necks 19 of the rolls 17 to hold them in place in their bearings. The upper end of each of the bearing retaining strips 24 is secured to a bracket 26 which extends through an opening 27 in the adjacent side frame member 14 and 16. The outer end of the bracket is in the form of a threaded bolt and a nut 28 thereon serves to draw the retaining strip against the bearing necks of the rolls. Extending downwardly through one flange of the frame member 16 is a set screw 29 which bears downwardly on the retaining strip bracket 26 and by means of which downward adjustment of the retaining strip may be had. Also extending downwardly through the side frame member is a set screw 31 which bears against a cap 32 on the upper end of the resilient bearing strip 21, a similar set screw and cap being provided on the opposite side of the trough at the other end of the bearing strip, as shown in Fig. 4.

All of the rolls are supported in the bearing structure just described and the soft rubber surfaced rolls 18 all terminate at the bearings nearest the end members 12 and 13. Connected to alternate metal fluted rolls 17 at one end of the roll bed are driving spindles 33 and connected to the remaining fluted rolls 17, at the other end of the roll bed, are driving spindles 34. The connection between the driving spindles and the rolls is shown in detail in Fig. 8 of the drawing and is preferably in the form of a loose sleeve 36 having a pin 37 connecting to the shank 38 of roll 17, whereby sufficient flexibility is provided to compensate for slight misalignment between the spindles and the rolls. The spindles 33 at the other end of the roll bed are similarly connected to alternate fluted rolls.

The outer end of each of the spindles 33 and 34 is mounted in a bearing 39, the several bearings being mounted in the end frame member 12 or 13 as the case may be in a groove 41. A retainer 42, in the form of a channel, serves to hold the bearings 39 in place. As may be seen in Figs. 7, 8 and 9, the bearings 39 are separated from each other by means of tapered screws 43 which are threaded into tapered recesses found in adjacent ends of the bearings and by means of which the bearings may be laterally adjusted in the groove 41 to align with their associated spindles. The arrangement of the bearings and the adjustment therefor are the same at both ends of the apparatus and a further description thereof is not deemed necessary.

Each of the spindles 33 is provided on its end with a sprocket 44 and each of the spindles 34 is provided with a sprocket 46 adjacent the bearings 39. All of the sprockets adjacent the end member 13 are driven by means of a common sprocket chain 47 and all of the sprockets adjacent the end member 12 are driven by a common sprocket chain 48, all from a drive shaft 49, so that they are all driven in a common direction as shown in Fig. 10 of the drawing.

Mounted within the arcuate trough formed by the conveyer bed is a helical screw conveyer 51 which is concentric with the trough and which has its flights 52 in closely spaced relation with respect to the surface of the rolls forming the roll bed. The flights of the conveyer are mounted on a pipe 53, which is journalled in bearings 54 and 56 in the end members 12 and 13 of the apparatus. In order to exert a lifting effect on the fruits or berries and to delay their transit from end to end of the trough, I provide a plurality of stirring members 57 which are welded to the flights and which project rearwardly therefrom toward the discharge end of the trough as shown in Figs. 1 and 2. These stirring members are inclined with respect to the longitudinal axis of the trough whereby to urge the fruits or berries toward the discharge end, but at a slower rate than is accomplished by the flights 52.

At 58 I show a feed hopper which opens through the end member 13 into a relatively shallow trough 59 which extends a short distance between the end member 13 and the beginning of the roll bed. Conveyer flights 61 which are smaller in diameter than the flights 51 are mounted on the pipe 53 to convey fruits or berries fed in through the hopper 58 onto the roll bed. The fruits or berries are conveyed from right to left of the apparatus as viewed in Figs. 1 and 2 and the stemmed berries or fruits are delivered out between the spindles 33 at the opposite end of the apparatus falling into a discharge chute 62.

The apparatus is driven by a motor 63, as shown particularly in Fig. 11 of the drawing, through a sprocket chain 64 which is passed over a sprocket 66 on the end of the conveyer shaft 53, to turn the conveyer in a clockwise direction as viewed from the right hand end of Fig. 1. The chain 64 then passes upwardly over a sprocket 68 on the end of the roll drive shaft 49 so as to turn that shaft in a counter-clockwise direction. The chain returns to the motor over an idler sprocket 67. The fluted rolls 17 are thus driven in a direction opposite to the direction of drive of the helical conveyer. The fluted rolls thus aid the helical conveyer in lifting the fruits or berries upwardly along the side of the trough formed by the roller beds. The conveyer flights 51 are provided with notches 55 where they pass over the bearing retainer strip 24. See Fig. 2.

From the foregoing description, the operation of my improved fruit and berry stemming machine will be readily understood. Fruit and/or berries to be stemmed are fed into the apparatus at one end through the feed chute 58 and are carried by the short sectional conveyer 61 on to the roll bed where they are engaged by the conveyer flights 51 and 57 and moved toward the opposite end of the roll bed. Preferably, the apparatus is disposed so that the roller bed lies horizontally or it may easily be tilted so that the discharge end is higher than the feed end. The fruits or berries are also engaged by the short stirring flights or members 57, which act to lift the fruits or berries upwardly along the left side of the roller bed as viewed in Fig. 4 of the drawing, thus causing them to engage with the rolls over a wider area. In order to prevent the berries from spilling over the side of the trough, I may provide a shield 70 along the leading side of the trough. In their travel over the roll bed, the stems are engaged by the fluted rolls as shown in Fig. 10 of the drawing and are pulled from the fruit passing through to the other side of the rolls. In order to keep the roll bed clean and to aid in removing the stems, I provide a pipe 71 through which water may be introduced under pressure and sprayed downwardly into the trough by means of spray heads 72.

From the foregoing it will be apparent that I have devised an improved fruit or berry stemming machine which is simple of design and of operation and which is adapted to remove the stems or caps from fruits or berries cleanly and expeditiously. I have found in the operation of my improved apparatus that this is accomplished without damage to the fruits or berries.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus for stemming fruits and berries, a roller bed comprising elongated alternating corrugated metal and soft rubber surfaced rolls disposed to form an arcuate trough with the rotational axes of the metal rolls inwardly of the trough with respect to those of the rubber surfaced rolls, means to drive the corrugated rolls, the rubber surfaced rolls being driven by frictional engagement with the metal rolls, spaced bearing necks formed along all the rolls, arcuate bearing supports on the outside of the trough opposite the bearing necks, yieldable bearings for the rolls disposed in the bearing supports, means to compress the yieldable bearings thereby to force the metal and rubber rolls together and conveyer means for moving berries or fruits from one end of the roller bed to the other.

2. In apparatus for stemming fruits and berries, a work bed comprised of a multiplicity of elongated fluted metal rolls alternating and in frictional engagement with a like number of soft rubber surfaced rolls and disposed to form an arcuate trough, spaced bearing necks on all the rolls, side frame members for the trough, bearing supports in the form of arcuate channels suspended from the side frame members on the outside of the trough opposite the bearing necks, resilient bearings for the rolls seated in the channels, means to compress the bearings, thereby to determine the frictional engagement between the rolls, and bearing retainers on the inside of the trough cooperating with the bearings.

3. In apparatus for stemming fruits and berries, a work bed comprised of a multiplicity of elongated fluted metal rolls alternating and in frictional engagement with a like number of soft rubber surfaced rolls and disposed to form an arcuate trough, spaced bearing necks on all the rolls, side frame members for the trough, bearing supports in the form of arcuate channels suspended from the side frame members on the outside of the trough opposite the bearing necks, resilient bearings for the rolls seated in the channels, means to compress the bearings thereby to determine the frictional engagement between the rolls, bearing retainers on the inside of the trough cooperating with the bearings, drive means for alternate fluted rolls at one end of the trough, and drive means for the remaining fluted rolls at the other end of the trough.

4. In apparatus for stemming fruits and berries, a work bed comprised of a multiplicity of elongated fluted metal rolls alternating and in frictional engagement with a like number of soft rubber surfaced rolls and disposed to form an arcuate trough, spaced bearing necks on all the rolls, side frame members for the trough, bearing supports in the form of arcuate channels suspended from the side frame members on the outside of the trough opposite the bearing necks, resilient bearings for the rolls seated in the channels, means to compress the bearings thereby to determine the frictional engagement between the rolls, bearing retainers on the inside of the trough cooperating with the bearings, drive means for alternate fluted rolls at one end of the trough, drive means for the remaining fluted rolls at the other end of the trough, a helical screw conveyor in the trough concentric therewith, and means to feed fruits or berries into one end of the trough to be conveyed to the opposite end thereof.

5. Apparatus as set forth in claim 4 in which the longitudinal axes of the fluted rolls lie inwardly of the trough with respect to the longitudinal axes of the soft rubber surfaced rolls, and in which the bearing retainers engage only the necks of the fluted rolls.

6. In apparatus for stemming fruits and berries, a roller bed comprising elongated alternating corrugated metal and soft rubber surfaced rolls disposed to form an arcuate trough with the rotational axes of the metal rolls inwardly of the trough with respect to those of the rubber surfaced rolls, means to drive the corrugated metal rolls, the rubber surfaced rolls being driven by frictional engagement with the metal rolls, spaced bearing necks formed along all rolls, arcuate bearing supports on the outside of the trough opposite the bearing necks, yieldable bearings for the rolls in the form of arcuate continuous strips of flexible material disposed in the bearing supports, an arcuate retainer associated with each of the bearing supports and mounted inside the trough to bear against the bearing necks of the metal rolls, means to apply a compressive force at each end of the strip thereby to force the metal and rubber rolls together, and a helical conveyor mounted in the trough with its flights concentric with and in closely spaced relation to the trough for moving fruits or berries from one end to the other thereof.

JOHN D. GADDIE.

REFERENCES CITED

The following references are of record in the file of this patent:

UNITED STATES PATENTS

| Number | Name | Date |
|---|---|---|
| 1,298,488 | Foote | Mar. 25, 1919 |
| 1,703,123 | Triplett | Feb. 26, 1929 |
| 2,180,567 | Urschel | Nov. 21, 1939 |
| 2,323,668 | Morgan | July 6, 1943 |